United States Patent
Chen et al.

(10) Patent No.: US 10,993,273 B2
(45) Date of Patent: Apr. 27, 2021

(54) METHOD AND DEVICE FOR DOWNLINK DATA TRANSMISSION

(71) Applicant: CHINA ACADEMY OF TELECOMMUNICATIONS TECHNOLOGY, Beijing (CN)

(72) Inventors: Li Chen, Beijing (CN); Haiyang Quan, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 162 days.

(21) Appl. No.: 16/301,433

(22) PCT Filed: Apr. 17, 2017

(86) PCT No.: PCT/CN2017/080712
§ 371 (c)(1),
(2) Date: Nov. 13, 2018

(87) PCT Pub. No.: WO2017/193766
PCT Pub. Date: Nov. 16, 2017

(65) Prior Publication Data
US 2019/0297654 A1 Sep. 26, 2019

(30) Foreign Application Priority Data
May 12, 2016 (CN) .......................... 201610317765.7

(51) Int. Cl.
*H04W 76/11* (2018.01)
*H04W 76/27* (2018.01)
(Continued)

(52) U.S. Cl.
CPC .......... *H04W 76/11* (2018.02); *H04L 1/1685* (2013.01); *H04L 1/1819* (2013.01);
(Continued)

(58) Field of Classification Search
CPC combination set(s) only.
See application file for complete search history.

(56) References Cited

U.S. PATENT DOCUMENTS

| 10,306,615 | B2* | 5/2019 | Chen ................... H04W 72/042 |
| 2015/0181491 | A1* | 6/2015 | Van Phan ............. H04W 36/26 370/331 |

(Continued)

FOREIGN PATENT DOCUMENTS

| CN | 1863088 A | 11/2006 |
| CN | 103313291 A | 9/2013 |

(Continued)

OTHER PUBLICATIONS

Extended European Search Report from EP app. No. 17795384.1, dated Apr. 5, 2019.
(Continued)

*Primary Examiner* — Xavier S Wong
(74) *Attorney, Agent, or Firm* — Ladas & Parry, LLP

(57) ABSTRACT

A method and a device for downlink data transmission are provided. The method includes: in the case that a network side has downlink data needing to be sent to a terminal in an inactive connection state, sending, to the terminal, by one or more access devices, an indication message carrying an inactive connection state terminal identification of the terminal; and receiving, by the one or more access devices, an uplink feedback initiated by the terminal based on the indication message. The terminal in the Inactive state may perform a fast downlink data transmission.

13 Claims, 4 Drawing Sheets

(51) Int. Cl.
    *H04L 1/18* (2006.01)
    *H04L 5/00* (2006.01)
    *H04W 48/16* (2009.01)
    *H04L 1/16* (2006.01)

(52) U.S. Cl.
    CPC ........... *H04L 5/0055* (2013.01); *H04W 48/16* (2013.01); *H04W 76/27* (2018.02)

(56) References Cited

U.S. PATENT DOCUMENTS

| | | | |
|---|---|---|---|
| 2015/0223106 A1* | 8/2015 | Van Phan | H04W 76/19 370/225 |
| 2015/0305041 A1* | 10/2015 | Kim | H04L 5/0037 370/329 |
| 2016/0150475 A1* | 5/2016 | Rune | H04W 76/27 370/311 |
| 2018/0235013 A1* | 8/2018 | Jung | H04W 52/50 |
| 2019/0007993 A1* | 1/2019 | Bergquist | H04W 76/27 |
| 2019/0123848 A1* | 4/2019 | Feng | H04L 5/0094 |
| 2019/0174554 A1* | 6/2019 | Deenoo | H04W 76/27 |
| 2019/0268882 A1* | 8/2019 | Baghel | H04W 72/04 |

FOREIGN PATENT DOCUMENTS

| | | |
|---|---|---|
| CN | 103763748 A | 4/2014 |
| CN | 104662980 A | 5/2015 |

OTHER PUBLICATIONS

Written Opinion of the International Searching Authority, from PCT/CN2017/080712, dated Jun. 29, 2017, with English translation from WIPO.
International Preliminary Report on Patentability from PCT/CN2017/080712, dated Nov. 13, 2018, with English translation from WIPO.
"Efficient small data transmission" 3GPP TSG-RAN WG2 Meeting #93bis, Dubrovnik, Croatia, Apr. 11-15, 2016.
"Efficient small data transmission with S1-based architecture", SA WG2 Meeting #110, Dubrovnik, Croatia, Jul. 6-10, 2015.
From PCT/CN2017080712, International search report dated Jun. 29, 2017 with translation provided by WIPO.
From PCT/CN2017080712, Written opinion, dated Jun. 29, 2017 with machine translation provided by Google.

* cited by examiner

METHOD AND DEVICE FOR DOWNLINK DATA TRANSMISSION

CROSS-REFERENCE TO RELATED APPLICATIONS

The present application is a U.S. national phase application of PCT Application No. PCT/CN2017/080712 filed on Apr. 17, 2017, which claims a priority of a Chinese patent application No. 2016103177653 filed in China on May 12, 2016, the disclosures of which are incorporated herein by reference in their entireties.

TECHNICAL FIELD

The present disclosure relates to the field of communications technologies, and in particular, to a method and a device for downlink data transmission.

BACKGROUND

In the terminal state in the related art, in addition to the RRC connection state allocated with the terminal air interface transmission unique identification C-RNTI can be directly used for data transmission and reception, when there is downlink data to be transmitted in other states, the terminal needs to initiate a connection establishment and turn to the RRC connection state to establish the RRC connection, to acquire the terminal air interface transmission unique identification for data transmission, i.e., the C-RNTI, for the subsequent data transmission. This process is not conducive to fast transmission in the case that the downlink data arrives.

SUMMARY

In view of the above technical problem, the present disclosure provides a method and a device for downlink data transmission, to solve the problem that the downlink data technology in the related art that the downlink data cannot be quickly transmitted in the case that the terminal is in an Inactive state.

In one aspect of the present disclosure, a method for downlink data transmission is provided, including:

in the case that a network side has downlink data needing to be sent to a terminal in an inactive connection state, sending, to the terminal, by one or more access devices, an indication message carrying an inactive connection state terminal identification of the terminal; and receiving, by the one or more access devices, an uplink feedback initiated by the terminal based on the indication message.

Optionally, the one or more access devices refer to all access devices in an effective area of the inactive connection state terminal identification of the terminal, or all access devices in an effective area of the inactive connection state terminal identification of the terminal in a position area of the terminal determined by the network side.

Optionally, the indication message carries one or more of:
the inactive connection state terminal identification;
an identification of whether the terminal is to turn to a connection state;
a small data packet sent by the access devices to the terminal;
an air interface transmission unique identification of the terminal allocated by the access devices; and
a resource used by the terminal to feed back the indication message.

Optionally, the resource used by the terminal to feed back the indication message includes any one of:
a dedicated uplink access sequence code and a time-frequency resource location of the dedicated uplink access sequence code;
a Hybrid Automatic Repeat Request (HARQ) feedback resource corresponding to the indication message.

Optionally, the method further includes:
determining, by the access devices, the terminal based on a dedicated uplink sequence and/or a time-frequency resource location sent by the dedicated uplink sequence, and sending a feedback acknowledgement message of the uplink feedback to the determined terminal, where the feedback acknowledgement message carries an identification of the dedicated uplink sequence; or sending, by the access devices, a feedback acknowledgement message of the uplink feedback to the terminal through the allocated air interface transmission unique identification of the terminal.

Optionally, the method further includes: determining by the access devices, in the case that the downlink data arrives, a service type of the downlink data;

in the case that the service type of the downlink data is a small data packet service, not triggering the terminal to turn to a connection state; in the case that the service type of the downlink data is a continuous service, triggering the terminal to turn to a connection state; or determining by the access devices, in the case that the downlink data arrives, a data size of the downlink data needing to be sent;

in the case that the data size of the downlink data is smaller than a predetermined threshold, not triggering the terminal to turn to a connection state; in the case that the data size of the downlink data is larger than the predetermined threshold, triggering the terminal to turn to a connection state.

In another aspect of the present disclosure, a method for downlink data transmission is further provided, including:

receiving, by a terminal, an indication message carrying an inactive connection state terminal identification of the terminal sent by one or more access devices;

initiating, by the terminal, an uplink feedback to the one or more access devices based on the indication message.

Optionally, the one or more access devices refer to all access devices in an effective area of the inactive connection state terminal identification of the terminal, or all access devices in an effective area of the inactive connection state terminal identification of the terminal in a position area of the terminal determined by the network side.

Optionally, the indication message carries one or more of:
the inactive connection state terminal identification;
an identification of whether the terminal is to turn to a connection state;
a small data packet sent by the terminal to the access devices;
an air interface transmission unique identification of the terminal allocated by the access devices; and
a resource used by the terminal to feed back the indication message.

Optionally, the resource used by the terminal to feed back the indication message includes any one of:
a dedicated uplink access sequence code and a time-frequency resource location of the dedicated uplink access sequence code;

a Hybrid Automatic Repeat Request (HARQ) feedback resource corresponding to the indication message.

Optionally, the initiating, by the terminal, an uplink feedback to the one or more access devices based on the indication message includes:

in the case that the terminal does not need to turn to the connection state, sending, by the terminal, a dedicated uplink sequence based on the dedicated uplink access sequence code and the time-frequency resource location of the dedicated uplink access sequence code specified by the indication message sent by the access devices; or in the case that the terminal does not need to turn to the connection state, sending, by the terminal, an acknowledgement (ACK) feedback based on a HARQ resource determined based on a HARQ resource feedback manner specified by the indication message sent by the access devices; or in the case that the terminal does not need to turn to the connection state, sending, by the terminal, an ACK feedback based on a HARQ resource determined based on a manner specified in a protocol.

Optionally, the initiating, by the terminal, an uplink feedback to the one or more access devices based on the indication message includes:

in the case that the terminal needs to turn to the connection state, sending, by the terminal, a dedicated uplink sequence based on the dedicated uplink access sequence code and the time-frequency resource location of the dedicated uplink access sequence code specified by the indication message, activating the air interface transmission unique identification of the terminal allocated by the access devices in the case that the indication message carries the air interface transmission unique identification of the terminal, to enable the terminal to turn to the connection state; or in the case that the terminal needs to turn to the connection state, sending, by the terminal, a dedicated uplink sequence based on the dedicated uplink access sequence code and the time-frequency resource location of the dedicated uplink access sequence code specified by the indication message, and initiating a Radio Resource Control (RRC) connection establishment process by the terminal in the case that the access devices do not allocate the air interface transmission unique identification of the terminal; or in the case that the terminal needs to turn to the connection state, sending, by the terminal, an ACK feedback based on a HARQ feedback resource specified in the indication message or a HARQ resource determined by a manner specified in a protocol, activating the air interface transmission unique identification of the terminal allocated by the access devices in the case that the indication message carries the air interface transmission unique identification of the terminal, to enable the terminal to turn to the connection state; or in the case that the terminal needs to turn to the connection state, sending, by the terminal, an ACK feedback based on a HARQ feedback resource specified in the indication message or a HARQ resource determined by a manner specified in a protocol, and initiating a RRC connection establishment process by the terminal in the case that the access devices do not allocate the air interface transmission unique identification of the terminal.

Optionally, the method further includes:

in the case that the terminal feeds back the indication message through a dedicated uplink sequence, receiving, by the terminal, a feedback acknowledgement message of the uplink feedback sent by the access devices based on the dedicated uplink sequence and/or a time-frequency resource location sent by the dedicated uplink sequence, where the feedback acknowledgement message carries an identification of the dedicated uplink sequence; or in the case that the terminal sends an ACK feedback and the terminal is determined to turn to the connection state, receiving, by the terminal, a feedback acknowledgement message of the uplink feedback sent by the accesses devices through the allocated air interface transmission unique identification of the terminal, to acknowledge the uplink feedback.

Optionally, the method further includes:

determining, by the terminal, whether the terminal needs to turn to a connection state based on the indication message;

in the case that the indication message carries an identification of turning to the connection state and the identification determines that the terminal needs to turn to the connection state, determining that the terminal needs to turn to the connection state; and/or in the case that the indication message carries an air interface transmission unique identification of the terminal allocated for the terminal, determining that the terminal needs to turn to the connection state.

In another aspect of the present disclosure, an access device is further provided, including:

a first sending module, configured to, in the case that a network side has downlink data needing to be sent to a terminal in an inactive connection state, send to the terminal an indication message carrying an inactive connection state terminal identification of the terminal; and a first receiving module, configured to receive an uplink feedback initiated by the terminal based on the indication message.

Optionally, the indication message carries one or more of:

the inactive connection state terminal identification;

an identification of whether the terminal is to turn to a connection state;

a small data packet sent by the access devices to the terminal;

an air interface transmission unique identification of the terminal allocated by the access devices; and a resource used by the terminal to feed back the indication message.

Optionally, the resource used by the terminal to feed back the indication message includes any one of:

a dedicated uplink access sequence code and a time-frequency resource location of the dedicated uplink access sequence code;

a Hybrid Automatic Repeat Request (HARQ) feedback resource corresponding to the indication message.

Optionally, the access device further includes a first feedback module configured to determine the terminal based on a dedicated uplink sequence and/or a time-frequency resource location sent by the dedicated uplink sequence, and send a feedback acknowledgement message of the uplink feedback to the determined terminal, where the feedback acknowledgement message carries an identification of the dedicated uplink sequence; or send a feedback acknowledgement message of the uplink feedback to the terminal through the allocated air interface transmission unique identification of the terminal.

Optionally, the access device further includes a first determining module configured to determine, in the case that the downlink data arrives, a service type of the downlink data; in the case that the service type of the downlink data is a small data packet service, not trigger the terminal to turn to a connection state; in the case that the service type of the downlink data is a continuous service, trigger the terminal to turn to a connection state; or determine, in the case that the downlink data arrives, a data size of the downlink data needing to be sent; in the case that the data size of the downlink data is smaller than a predetermined threshold, not trigger the terminal to turn to a connection state; in the case that the data size of the downlink data is larger than the predetermined threshold, trigger the terminal to turn to a connection state.

In another aspect of the present disclosure, a terminal is further provided, including:

a second receiving module, configured to receive an indication message carrying an inactive connection state terminal identification of the terminal sent by one or more access devices; and a second feedback module, configured to initiate an uplink feedback to the one or more access devices based on the indication message.

Optionally, the one or more access devices refer to all access devices in an effective area of the inactive connection state terminal identification of the terminal, or all access devices in an effective area of the inactive connection state terminal identification of the terminal in a position area of the terminal determined by the network side.

Optionally, the indication message carries one or more of:

the inactive connection state terminal identification;

an identification of whether the terminal is to turn to a connection state;

a small data packet sent by the terminal to the access devices;

an air interface transmission unique identification of the terminal allocated by the access devices; and a resource used by the terminal to feed back the indication message.

Optionally, the resource used by the terminal to feed back the indication message includes any one of:

a dedicated uplink access sequence code and a time-frequency resource location of the dedicated uplink access sequence code;

a Hybrid Automatic Repeat Request (HARQ) feedback resource corresponding to the indication message.

Optionally, the second feedback module is further configured to in the case that the terminal does not need to turn to the connection state, send a dedicated uplink sequence based on the dedicated uplink access sequence code and the time-frequency resource location of the dedicated uplink access sequence code specified by the indication message sent by the access devices; or in the case that the terminal does not need to turn to the connection state, send an acknowledgement (ACK) feedback based on a HARQ resource determined based on a HARQ resource feedback manner specified by the indication message sent by the access devices; or in the case that the terminal does not need to turn to the connection state, send an ACK feedback based on a HARQ resource determined based on a manner specified in a protocol; or in the case that the terminal needs to turn to the connection state, send a dedicated uplink sequence based on the dedicated uplink access sequence code and the time-frequency resource location of the dedicated uplink access sequence code specified by the indication message, activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send a dedicated uplink sequence based on the dedicated uplink access sequence code and the time-frequency resource location of the dedicated uplink access sequence code specified by the indication message, and initiate a Radio Resource Control (RRC) connection establishment process in the case that the access devices do not allocate the air interface transmission unique identification of the terminal; or in the case that the terminal needs to turn to the connection state, send an ACK feedback based on a HARQ feedback resource specified in the indication message or a HARQ resource determined by a manner specified in a protocol, and activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send an ACK feedback based on a HARQ feedback resource specified in the indication message or a HARQ resource determined by a manner specified in a protocol, and initiate a RRC connection establishment process in the case that the access devices do not allocate the air interface transmission unique identification of the terminal.

Optionally, the terminal further includes a second receiving module configured to in the case that the terminal feeds back the indication message through a dedicated uplink sequence, receive a feedback acknowledgement message of the uplink feedback sent by the access devices based on the dedicated uplink sequence and/or a time-frequency resource location sent by the dedicated uplink sequence, where the feedback acknowledgement message carries an identification of the dedicated uplink sequence; or in the case that the terminal sends an ACK feedback and the terminal is determined to turn to the connection state, receive a feedback acknowledgement message of the uplink feedback sent by the accesses devices through the allocated air interface transmission unique identification of the terminal, to acknowledge the uplink feedback.

Optionally, the terminal further includes a second determining module configured to determine whether the terminal needs to turn to a connection state based on the indication message;

in the case that the indication message carries an identification of turning to the connection state and the identification determines that the terminal needs to turn to the connection state, determine that the terminal needs to turn to the connection state; and/or in the case that the indication message carries an air interface transmission unique identification of the terminal allocated for the terminal, determine the terminal needs to turn to the connection state.

In another aspect of the present disclosure, an access device is further provided, including a processor, a transceiver and a memory, where the processor is configured to read a program in the memory to:

in the case that a network side has downlink data needing to be sent to a terminal in an inactive connection state, send to the terminal an indication message carrying an inactive connection state terminal identification of the terminal; and receive an uplink feedback initiated by the terminal based on the indication message;

the transceiver is configured to receive and send data, and the memory is configured to store the data used by the processor when performing an operation.

In another aspect of the present disclosure, a terminal is further provided, including a processor, a transceiver and a memory, where the processor is configured to read a program in the memory to:

receive an indication message carrying an inactive connection state terminal identification of the terminal sent by one or more access devices; and initiate an uplink feedback to the one or more access devices based on the indication message;

the transceiver is configured to receive and send data, and the memory is configured to store the data used by the processor when performing an operation.

According to the embodiments of the present disclosure, in the case that a network side has downlink data needing to be sent to a terminal in an inactive connection state, one or more access devices send to the terminal an indication message carrying an inactive connection state terminal identification of the terminal, and the one or more access devices receives an uplink feedback initiated by the terminal based on the indication message, that is, the terminal in the Inactive state may perform a fast downlink data transmission. Furthermore, since the access device can send the small data packet to the terminal in the Inactive state, thereby avoiding the signaling overhead caused by the transition of the terminal state, flexibly determining whether the terminal needs state transition, and further reducing unnecessary signaling overhead.

DETAILED DESCRIPTION

Figure 1:
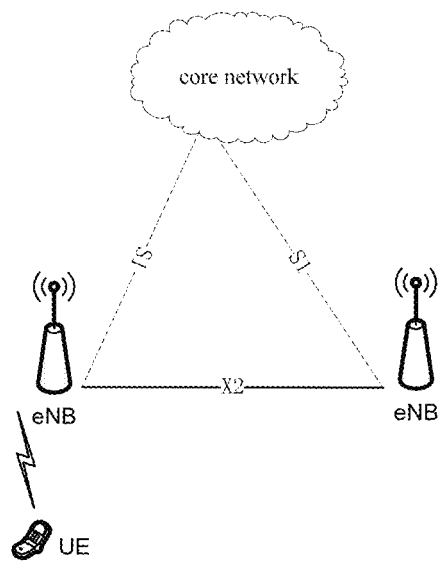
FIG. 1 is a network deployment structure view of an exemplary application scenario in some embodiments of the present disclosure.

In order to make the objects, the technical solutions and the advantages of the present disclosure more apparent, the present disclosure will be described hereinafter in details in conjunction with the drawings. Obviously, the following embodiments merely relate to a part of, rather than all of, the embodiments of the present disclosure. Based on these embodiments, a person skilled in the art may, without any creative effort, obtain the other embodiments, which also fall within the scope of the present disclosure.

Those skilled in the art will appreciate that embodiments of the present disclosure may be implemented as a system, apparatus, device, method, or computer program product. Thus, embodiments of the present disclosure may be embodied in the form of full hardware, complete software (including firmware, resident software, microcode, etc.), or a combination of hardware and software.

In some embodiments of the present disclosure, a method and apparatus for downlink data transmission are provided. The embodiments of the present disclosure can be applied to different network deployment structures. For convenience of description, two network deployment structures that may be adopted for future mobile communication are first introduced.

The inventors have found that with the development of wireless communication systems, terminal types and service types are diversified, and the requirements of power saving, network resources saving are coexist with the needs of various service types. In order to ensure terminal power saving and fast data transmission at the same time, a terminal state, i.e., inactive state (inactive connection state) is introduced. In this state, the terminal maintains the core network connection, but does not perform the normal operation of the air interface connection state (such as switching, uplink timing update, radio link monitoring), does not allocate the terminal identification (such as C-RNTI) that is directly used for air interface transmission, and therefore cannot directly perform the air interface scheduling transmission.

In the terminal state in the related art, in addition to the RRC connection state, the terminal air interface transmission unique identification C-RNTI can be directly used for data transmission and reception. In the case that other states have downlink data to be transmitted, the terminal must initiate connection establishment and turn to the RRC connection state. The RRC connection is established, and the unique identification of the terminal air interface for data transmission, that is, the C-RNTI is obtained, for subsequent data transmission. This process is not conducive to the fast transmission in the case that the downlink data arrives. In addition, if only the small data packet needs to be sent, such as the typical MTC (Machine Type Communication) service, the terminal enters the connection state and sends a small data packet, then may turn to the idle state or the Inactive state to save power, this state transition will cause signaling overhead. If the number of terminals is large (such as massive MTC scenario), such signaling overhead is unacceptable.

Based on the analysis of the above findings of the inventor, the basic principle of the present disclosure is: in the case that the network side has the downlink data which need to be sent to a terminal that is not connected to a single cell, one or more base stations send to the terminal an indication message carrying an inactive connection state terminal identification of the terminal, and the terminal initiates an uplink feedback based on the indication message.

The above-mentioned failure to establish a connection with a single cell mainly refers to a newly introduced terminal state, an inactive connection state (Inactive state), in which the following behavior is allowed: (1) the core network establishes a connection with the RAN side; (2) The mobility is performed by the UE, and is performed by cell reselection in the area pre-configured by the network side, instead of the handover process; (3) the terminal is assigned a unique user identification in the area pre-configured by the network side, and the pre-configured area includes a plurality of cells in the one or more base stations, which brings mobility freedom to the terminal while simplifying the mobility.

In the inactive state, the network side allocates a valid RAN identification in a certain area for the terminal. The identification is used to identify the terminal in the inactive state, and can be used for the network side to find the terminal or as the identity for the terminal actively initiating the uplink access to turn to the connection state. The inactive connection state terminal identification may be referred to as an Inactive UE ID, and may also be referred to as a resume UE ID. The identification is different from the globally unique IMSI or the connection state terminal identification C-RNTI, and the identification length is between the two (for example, the length of the Inactive UE ID is 40 bits, and the length of the C-RNTI is 16 bits), and only valid in a certain area having a plurality of cells or eNBs, and the terminal needs to update the Inactive UE ID if exceeding the area.

Referring to FIG. 1 which is a network deployment structure view of an exemplary application scenario in some embodiments of the present disclosure, the network deployment structure belongs to a typical LTE architecture and includes: a base station (eNB) and a terminal (UE). The eNB has a plurality of cells. In the connection state, the terminal UE and the cell perform an air interface data transmission and reception there between, and the UE in the connection state allocates a unique UE identification C-RNTI within the cell.

Figure 2:
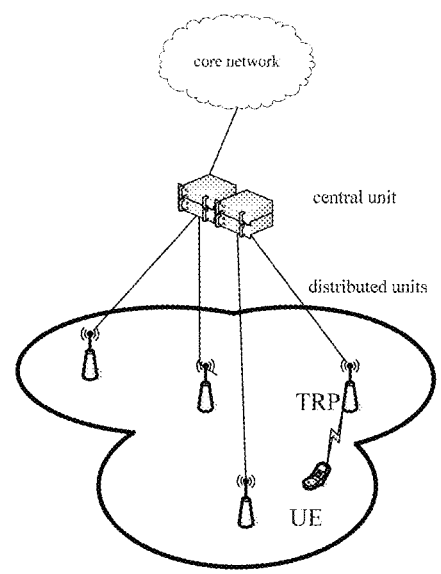
FIG. 2 is a network deployment structure view of an exemplary application scenario in some embodiments of the present disclosure.

Referring to FIG. 2 which is a network deployment structure view of an exemplary application scenario in some embodiments of the present disclosure. The network side node is divided into a central unit (CU) and a distributed unit (DU), and the user side node is the terminal.

FIG. 2 shows an architecture that may be adopted by the mobile communication 5G in the future. The network side node includes a central unit and a distributed unit, and one central unit controls a plurality of distributed units deployed in a certain area, and the distributed units perform the air interface transmission with the terminal via the Transmission Reception Point (TRP). One or more transmission points can simultaneously serve the terminal for data transmission. Regardless of the method, the data is scheduled and transmitted through the terminal air interface unique identification allocated to the terminal by the network side, and this identification may be C-RNTI or TRP-RNTI.

It should be noted that the embodiments of the present disclosure are applicable to the above two RAN (Radio Access Network) architectures. To unify the description in the following, and the unique identification of the terminal used for the terminal connection state transmission is called an air interface transmission unique identification of the terminal, and this identification is C-RNTI in the LTE in the related art. The unique identification of the terminal in the inactive state is called as an Inactive UE ID. The network side wireless signaling and data transceiving node is collectively referred to as an access device, whether it is the eNB in FIG. 1 or the CU/DU in FIG. 2 (the specific sending and receiving point is TRP).

A method of downlink data transmission in some embodiments of the present disclosure will be described below with reference to FIG. 3 in conjunction with the application scenario illustrated in FIG. 1 or FIG. 1*t* should be noted that the above application scenarios are only for the purpose of facilitating understanding of the principle of the present disclosure, and the embodiments of the present disclosure are not limited in this respect. Instead, the embodiments of the present disclosure may be applied to any applicable scenario.

Figure 3:
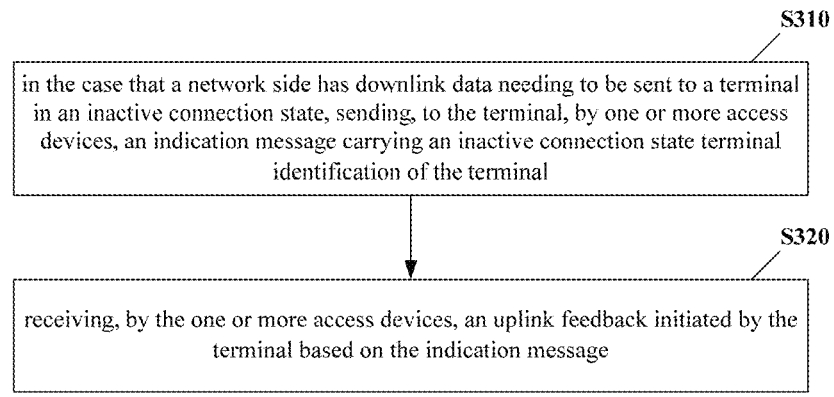
FIG. 3 is a schematic view of a method of downlink data transmission in some embodiments of the present disclosure.

FIG. 3 is a schematic view of a method of downlink data transmission in some embodiments of the present disclosure, the executive body of the method is an access device.

Step S310: in the case that a network side has downlink data needing to be sent to a terminal in an inactive connection state, sending, to the terminal, by one or more access devices, an indication message carrying an inactive connection state terminal identification of the terminal, and then method proceeding to step S320.

The one or more access devices refer to all access devices in an effective area of the inactive connection state terminal identification of the terminal (e.g., Inactive UE ID), or all access devices in an effective area of the inactive connection state terminal identification of the terminal (e.g., Inactive UE ID) in a position area of the terminal determined by the network side, i.e., a subset of all the base stations in the effective area of the inactive connection state terminal identification of the terminal.

Step S320: receiving, by the one or more access devices, an uplink feedback initiated by the terminal based on the indication message.

In some embodiments of the present disclosure, the indication message sent by the access device to the terminal refers to an indication message used by the access device to find the terminal and perform data transmission, which is similar to the paging message, but the traditional paging message is initiated by the core network. In some embodiments of the present disclosure, the indication message sent by the access device to the terminal is initiated by the RAN network side. The terminal uses the DRX mode to monitor and receive the base station indication message in the specified time domain position of the specified period, so as to save the power.

The above indication message may carry one or more of the following. If it is to unify the transmission format design, the domain other than the small data packet may be used as the fixed format, and the domain may be filled with the reserved redundancy bit in the case of not allocated:

(1) the inactive connection state terminal identification, configured to identify the terminal, for example, the Inactive UE ID;

(2) an identification $C_i$ of whether the terminal is to turn to a connection state; optionally, the design is that, if the access device does not allocate an air interface transmission unique identification for the terminal, the terminal does not need to turn to the connection state in default. Whether the terminal turns to the connection state is determined by the service characteristics of the data to be transmitted. If the service arriving at the network side is only a burst of small data packets, the terminal may receive the small data packet in the Inactive state; if the service arriving at the network side is continuous service data, the terminal may be instructed to turn to the connection state;

(3) a small data packet sent by the access devices to the terminal;

(4) an air interface transmission unique identification of the terminal allocated by the access devices, the identification is used for data scheduling transmission after the terminal turns to the connection state. After the terminal confirms the indication message of the access device in a cell or a specific transmission point set, the air interface transmission unique identification of the terminal is valid in the cell or a specific transmission point set, and is released to other terminals in other cells or a specific transmission point set;

(5) a resource used by the terminal to feed back the indication message. Manner 1: a dedicated uplink access sequence code and a time-frequency resource location of the dedicated uplink access sequence code; Method 2: a Hybrid Automatic Repeat Request (HARQ) feedback resource corresponding to the indication message, such as the feedback sequence code on the specific resource location corresponding to the location of the time-frequency resource of the indication message. If Manner 2 is adopted, the HARQ feedback sequence and its location for the terminal to feed back the indication message may be specified in the manner specified by the protocol, instead of the instruction of the access device, noting that there is only ACK feedback but NACK feedback.

Optionally, after receiving the feedback from the terminal, the method further includes:

in the case that the terminal feeds back the indication message through a dedicated uplink sequence, resending, by the access devices, a feedback acknowledgement message to the terminal based on a dedicated uplink sequence and/or a time-frequency resource location sent by the dedicated uplink sequence, where the feedback acknowledgement message carries an identification of the dedicated uplink sequence; in the case that it is determined that the access device is to send a re-acknowledgement message, the terminal may resend the dedicated uplink sequence if the terminal does not receive the re-acknowledgement message of the access device, until the re-acknowledgement message of the access device is received or the uplink sequence transmission maximum number is reached.

Figure 4:
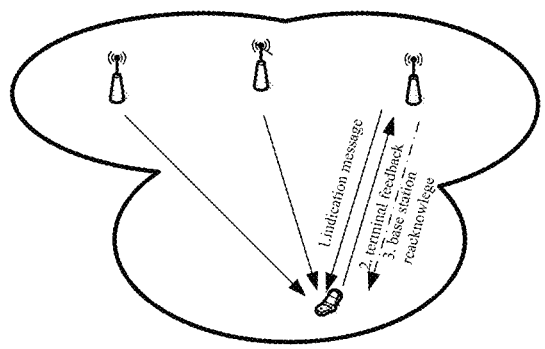
FIG. 4 is a schematic flowchart of receiving by an access device a feedback from a terminal in some embodiments of the present disclosure.

In the case that the terminal sends an ACK feedback and the terminal is determined to turn to the connection state, the access devices may send a feedback acknowledgement message of the uplink feedback to the terminal through the allocated air interface transmission unique identification of the terminal as shown in FIG. 4.

In some embodiments of the present disclosure, in the case that the downlink data arrives, the access devices may determine a service type of the downlink data; in the case that the service type of the downlink data is a small data packet service, the terminal is not triggered to turn to a connection state; in the case that the service type of the downlink data is a continuous service, the terminal is triggered to turn to a connection state.

In some embodiments of the present disclosure, in the case that the downlink data arrives, the access devices may determine a data size of the downlink data needing to be sent; in the case that the data size of the downlink data is smaller than a predetermined threshold, the terminal is not triggered to turn to a connection state; in the case that the data size of the downlink data is larger than the predetermined threshold, triggering the terminal to turn to a connection state.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

A method of downlink data transmission in some embodiments of the present disclosure will be described below with reference to FIG. 5 in conjunction with the application scenario illustrated in FIG. 1 or FIG. It should be noted that the above application scenarios are only for the purpose of facilitating understanding of the spirit and principle of the present disclosure, and the embodiments of the present disclosure are not limited in this respect. Instead, the embodiments of the present disclosure may be applied to any scenario that is applicable.

Figure 5:
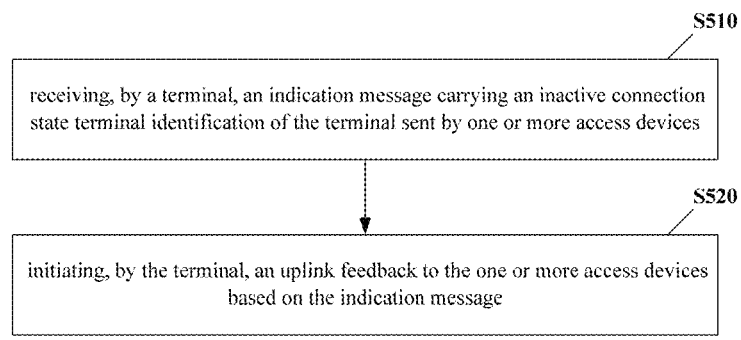
FIG. 5 is a schematic view of a method of downlink data transmission in some embodiments of the present disclosure.

FIG. 5 is a schematic view of a method of downlink data transmission in some embodiments of the present disclosure, the method is executed by a terminal, which may be a mobile telephone (or handset), or otherwise capable of transmitting Or a device that receives wireless signals, including user equipment (terminals), personal digital assistants (PDAs), wireless modems, wireless communication devices, hand-held devices, laptop computers, cordless phones, wireless local loop (WLL) stations, a CPE (Customer Premise Equipment) or a mobile smart hotspot capable of transferring mobile signal to the WiFi signal, a smart home appliance, or other device that can spontaneously communicate with a mobile communication network without human operation.

Step S510: receiving, by a terminal, an indication message carrying an inactive connection state terminal identification of the terminal sent by one or more access devices;

The one or more access devices are all the access devices in the effective area of the terminal inactive connection state (for example, the Inactive UE ID), or the network side determines the inactive connection state in the location area of the terminal. The terminal identification (for example, the Inactive UE ID) is a subset of all the base stations in the effective area, that is, the terminal in the inactive connection state.

Step S520: initiating, by the terminal, an uplink feedback to the one or more access devices based on the indication message;

The above indication message may carry one or more of the following. If it is to unify the transmission format design, the domain other than the small data packet may be used as the fixed format, and the domain may be filled with the reserved redundancy bit in the case of not allocated:

(1) the inactive connection state terminal identification, configured to identify the terminal, for example, the Inactive UE ID;

(2) an identification Ci of whether the terminal is to turn to a connection state; optionally, the design is that, if the access device does not allocate an air interface transmission unique identification for the terminal, the terminal in default does not need to turn to the connection state. Whether the terminal turns to the connection state is determined by the service characteristics of the data to be transmitted. If the service arriving at the network side is only a burst of small data packets, the terminal may receive the small data packet in the Inactive state; if the service arriving at the network side is continuous service data, the terminal may be instructed to turn to the connection state;

(3) a small data packet sent by the access devices to the terminal;

(4) an air interface transmission unique identification of the terminal allocated by the access devices, the identification is used for data scheduling transmission after the terminal turns to the connection state. After the terminal confirms the indication message of the access device in a cell or a specific transmission point set, the air interface transmission unique identification of the terminal is valid in the cell or a specific transmission point set, and is released to other terminals in other cells or a specific transmission point set;

(5) a resource used by the terminal to feed back the indication message. Manner 1: a dedicated uplink access sequence code and a time-frequency resource location of the dedicated uplink access sequence code; Method 2: a Hybrid Automatic Repeat Request (HARQ) feedback resource corresponding to the indication message, such as the feedback sequence code on the specific resource location corresponding to the location of the time-frequency resource of the indication message. If Manner 2 is adopted, the HARQ feedback sequence and its location for the terminal to feed back the indication message may be specified in the manner specified by the protocol, instead of the instruction of the access device, noting that there is only ACK feedback but NACK feedback.

In some embodiments of the present disclosure, the initiating, by the terminal, an uplink feedback to the one or more access devices based on the indication message includes:

in the case that the terminal does not need to turn to the connection state, sending, by the terminal, a dedicated uplink sequence based on the dedicated uplink access sequence code and the time-frequency resource location of the dedicated uplink access sequence code specified by the indication message sent by the access devices; or in the case that the terminal does not need to turn to the connection state, sending, by the terminal, an acknowledgement (ACK) feedback based on a HARQ resource determined based on a HARQ resource feedback manner specified by the indication message sent by the access devices; or in the case that the terminal does not need to turn to the connection state, sending, by the terminal, an ACK feedback based on a HARQ resource determined based on a manner specified in a protocol.

In the case that the terminal needs to turn to the connection state, the terminal sends a dedicated uplink sequence based on the dedicated uplink access sequence code and the time-frequency resource location of the dedicated uplink access sequence code specified by the indication message, and activates the air interface transmission unique identification of the terminal allocated by the access devices in the case that the indication message carries the air interface transmission unique identification of the terminal, to enable the terminal to turn to the connection state; or in the case that the terminal needs to turn to the connection state, the terminal sends a dedicated uplink sequence based on the dedicated uplink access sequence code and the time-frequency resource location of the dedicated uplink access sequence code specified by the indication message, and initiates a Radio Resource Control (RRC) connection establishment process by the terminal in the case that the access devices do not allocate the air interface transmission unique identification of the terminal; or in the case that the terminal needs to turn to the connection state, the terminal sends an ACK feedback based on a HARQ resource determined based on a HARQ resource feedback manner specified by the indication message or a manner specified in a protocol, and activates the air interface transmission unique identification of the terminal allocated by the access devices in the case that the indication message carries the air interface transmission unique identification of the terminal, to enable the terminal to turn to the connection state; or in the case that the terminal needs to turn to the connection state, the terminal sends an ACK feedback based on a HARQ resource determined based on a HARQ resource feedback manner specified by the indication message or a manner specified in a protocol, and initiates a RRC connection establishment process by the terminal in the case that the access devices do not allocate the air interface transmission unique identification of the terminal.

Optionally, the method further includes:

in the case that the terminal feeds back the indication message through a dedicated uplink sequence, receiving, by the terminal, a feedback acknowledgement message of the uplink feedback sent by the access devices based on the dedicated uplink sequence and/or a time-frequency resource location sent by the dedicated uplink sequence, where the feedback acknowledgement message carries an identification of the dedicated uplink sequence; or in the case that the terminal sends an ACK feedback and the terminal is determined to turn to the connection state, receiving, by the terminal, a feedback acknowledgement message of the uplink feedback sent by the accesses devices through the allocated air interface transmission unique identification of the terminal, to acknowledge the uplink feedback.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

Some scenarios of the present disclosure are applicable to the case where the access device transmits a small data packet at a time, and the terminal side uses the dedicated uplink sequence for feedback.

Step 1: All the access devices in the effective area of the Inactive UE ID, or all the access devices in the effective area of the Inactive UE ID in the approximate location of the terminal if the approximate location of the terminal can be determined (i.e., a subset of all the access devices in the effective area of the Inactive UE ID) send an indication message to the terminal, where the message carries the following fields:

UE Inactive ID;

small packets sent to the terminal;

an identification Ci of whether the terminal is to turn to a connection state; optionally, the design is that, if the access device does not allocate an air interface transmission unique identification for the terminal, the terminal does not need to turn to the connection state in default;

the dedicated uplink access sequence code and the time-frequency resource location of the dedicated uplink access sequence code used by the terminal for feedback.

Step 2: the terminal sends a dedicated uplink sequence based on the dedicated uplink access sequence code and the time-frequency resource location of the dedicated uplink access sequence code specified by the indication message Step 3: After receiving the feedback from the terminal, the access devices resend an acknowledgement message to the terminal based on the dedicated uplink sequence and/or a time-frequency resource location sent by the dedicated uplink sequence, where the acknowledgement message carries an identification of the dedicated uplink sequence.

In addition, the terminal resends the dedicated uplink sequence if the terminal does not receive the re-acknowledgement message of the base station, until the re-acknowledgement message of the access device is received or the uplink sequence transmission maximum number is reached.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

Some scenarios applicable to some embodiments of the present disclosure are: the access device sends a small data packet at a time, and the terminal side uses HARQ resource for feedback.

Step 1: All the access devices in the effective area of the Inactive UE ID, or all the access devices in the effective area of the Inactive UE ID in the approximate location of the terminal if the approximate location of the terminal can be determined (i.e., a subset of all the access devices in the effective area of the Inactive UE ID) send an indication message to the terminal, where the message carries the following fields:

UE Inactive ID;

small packets sent to the terminal;

an identification Ci of whether the terminal is to turn to a connection state; optionally, the design is that, if the access device does not allocate an air interface transmission unique identification for the terminal, the terminal does not need to turn to the connection state in default;

a HARQ feedback resource corresponding to the indication message sent by the access devices used by the terminal for feedback, such as the feedback sequence code on the specific resource location corresponding to the location of the time-frequency resource of the indication message, this domain can be adopted, the HARQ feedback sequence and its location for the terminal to feed back the indication message may be specified in the manner specified by the protocol, instead of the instruction of the access device, noting that there is only ACK feedback but NACK feedback.

Step 2: the terminal sends an ACK feedback based on a HARQ feedback resource specified in the indication message or a HARQ resource determined by a manner specified in a protocol;

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

Some scenarios of the present disclosure are applicable to the case where the access device side triggers the terminal to turn to the connection state, and the terminal side uses the dedicated uplink sequence for feedback.

Step 1: All the access devices in the effective area of the Inactive UE ID, or all the access devices in the effective area of the Inactive UE ID in the approximate location of the terminal if the approximate location of the terminal can be determined (i.e., a subset of all the access devices in the effective area of the Inactive UE ID) send an indication message to the terminal, where the message carries the following fields:

UE Inactive ID;

small packets sent to the terminal;

an identification Ci of whether the terminal is to turn to a connection state; optionally, the design is that, if the access device does not allocate an air interface transmission unique identification for the terminal, the terminal does not need to turn to the connection state in default;

the dedicated uplink access sequence code and the time-frequency resource location of the dedicated uplink access sequence code used by the terminal for feedback;

an air interface transmission unique identification of the terminal allocated for the terminal.

Step 2: the terminal sends a dedicated uplink sequence based on the dedicated uplink access sequence code and the time-frequency resource location of the dedicated uplink access sequence code specified by the indication message sent by the access devices;

Step 3: After receiving the feedback from the terminal, the access devices resend an acknowledgement message to the terminal based on the dedicated uplink sequence and/or a time-frequency resource location sent by the dedicated uplink sequence, where the feedback acknowledgement message carries an identification of the dedicated uplink sequence.

In addition, the terminal resends the dedicated uplink sequence if the terminal does not receive the re-acknowledgement message of the access devices, until the re-acknowledgement message of the access device is received or the uplink sequence transmission maximum number is reached.

Step 4: the terminal turns to the connection state.

Subsequently, the access devices and the terminal use the air interface transmission unique identification of the terminal to perform the data scheduling and transmission. The air interface transmission unique identification is valid in a specific cell or a specific transmission point set (the specific cell or a specific transmission point set is a network side air interface transmission node that finally confirms the terminal feedback), and is released in other cells or a specific transmission point set, which can be used by other terminals.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

Some scenarios of the present disclosure are applicable to the case where the access device side triggers the terminal to turn to the connection state, and the terminal side uses the HARQ resource for feedback.

Step 1: All the access devices in the effective area of the Inactive UE ID, or all the access devices in the effective area of the Inactive UE ID in the approximate location of the terminal if the approximate location of the terminal can be determined (i.e., a subset of all the access devices in the effective area of the Inactive UE ID) send an indication message to the terminal, where the message carries the following fields:

UE Inactive ID;

small packets sent to the terminal;

an identification Ci of whether the terminal is to turn to a connection state; optionally, the design is that, if the access device does not allocate an air interface transmission unique identification for the terminal, the terminal does not need to turn to the connection state in default;

a HARQ feedback resource corresponding to the indication message sent by the access devices used by the terminal for feedback, such as the feedback sequence code on the specific resource location corresponding to the location of the time-frequency resource of the indication message, this domain can be adopted, the HARQ feedback sequence and its location for the terminal to feed back the indication message may be specified in the manner specified by the protocol, instead of the instruction of the access device, noting that there is only ACK feedback but NACK feedback;

an air interface transmission unique identification of the terminal allocated for the terminal.

Step 2: the terminal sends an ACK feedback based on a HARQ feedback resource specified in the indication message or a HARQ resource determined by a manner specified in a protocol;

Step 3: After receiving the feedback from the terminal, the access devices resend an acknowledgement message to the terminal, where the acknowledgement message carries the air interface transmission unique identification of the terminal;

Step 4: the terminal turns to the connection state.

Subsequently, the access devices and the terminal use the air interface transmission unique identification of the terminal to perform the data scheduling and transmission. The air interface transmission unique identification is valid in a specific cell or a specific transmission point set (the specific cell or a specific transmission point set is a network side air interface transmission node that finally confirms the terminal feedback), and is released in other cells or a specific transmission point set, which can be used by other terminals.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

Some scenarios of the present disclosure are applicable to the case where the access device side triggers the terminal to turn to the connection state, and the terminal side uses the dedicated uplink sequence for feedback, and the air interface transmission unique identification of the terminal is not allocated in the indication message sent by the access devices.

Step 1: All the access devices in the effective area of the Inactive UE ID, or all the access devices in the effective area of the Inactive UE ID in the approximate location of the terminal if the approximate location of the terminal can be determined (i.e., a subset of all the access devices in the effective area of the Inactive UE ID) send an indication message to the terminal, where the message carries the following fields:

UE Inactive ID;

small packets sent to the terminal;

an identification Ci of whether the terminal is to turn to a connection state;

the dedicated uplink access sequence code and the time-frequency resource location of the dedicated uplink access sequence code used by the terminal for feedback.

Step 2: the terminal sends a dedicated uplink sequence based on the dedicated uplink access sequence code and the time-frequency resource location of the dedicated uplink access sequence code specified by the indication message Step 3: After receiving the feedback from the terminal, the access devices resend an acknowledgement message to the terminal based on the dedicated uplink sequence and/or a time-frequency resource location sent by the dedicated uplink sequence, where the acknowledgement message carries an identification of the dedicated uplink sequence, allocate an air interface transmission unique identification for the terminal.

In addition, the terminal resends the dedicated uplink sequence if the terminal does not receive the re-acknowledgement message of the access devices, until the re-acknowledgement message of the access device is received or the uplink sequence transmission maximum number is reached.

Step 4: the terminal turns to the connection state and uses the air interface transmission unique identification allocated for the terminal by the access devices for the subsequent data scheduling and transmission.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

Some scenarios of the present disclosure are applicable to the case where the access device side triggers the terminal to turn to the connection state, and the terminal side uses the HARQ resource for feedback, and the air interface transmission unique identification of the terminal is not allocated in the indication message sent by the access devices.

Step 1: All the access devices in the effective area of the Inactive UE ID, or all the access devices in the effective area of the Inactive UE ID in the approximate location of the terminal if the approximate location of the terminal can be determined (i.e., a subset of all the access devices in the effective area of the Inactive UE ID) send an indication message to the terminal, where the message carries the following fields:

UE Inactive ID;

small packets sent to the terminal;

an identification Ci of whether the terminal is to turn to a connection state; optionally, the design is that, if the access device does not allocate an air interface transmission unique identification for the terminal, the terminal does not need to turn to the connection state in default;

a HARQ feedback resource corresponding to the indication message sent by the access devices used by the terminal for feedback, such as the feedback sequence code on the specific resource location corresponding to the location of the time-frequency resource of the indication message, this domain can be adopted, the HARQ feedback sequence and its location for the terminal to feed back the indication message may be specified in the manner specified by the protocol, instead of the instruction of the access device, noting that there is only ACK feedback but NACK feedback;

Step 2: the terminal sends an ACK feedback based on a HARQ feedback resource specified in the indication message or a HARQ resource determined by a manner specified in a protocol;

Step 3: After receiving the feedback from the terminal, the access devices resend an acknowledgement message to the terminal, where the acknowledgement message carries the air interface transmission unique identification of the terminal;

Step 4: the terminal initiates a connection establishment process to the network side, turns to the connection state, and acquires the air interface transmission unique identification of the terminal for the subsequent data scheduling and transmission.

It should be noted that the foregoing Steps 2 and 3 are optional steps, and the access device may determine that the indication message is correctly received by the terminal directly by Step 4.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

In some embodiments of the present disclosure, the access device may also determine whether the terminal is to turn to a connection state, the process thereof includes:

determining by the access devices, in the case that the downlink data arrives, a service type of the downlink data; in the case that the service type of the downlink data is a small data packet service, not triggering the terminal to turn to a connection state; in the case that the service type of the downlink data is a continuous service, triggering the terminal to turn to a connection state; or determining by the access devices, in the case that the downlink data arrives, a data size of the downlink data needing to be sent; in the case that the data size of the downlink data is smaller than a predetermined threshold, not triggering the terminal to turn to a connection state; in the case that the data size of the downlink data is larger than the predetermined threshold, triggering the terminal to turn to a connection state.

According to some embodiments of the present disclosure, it is able to flexibly determine whether a terminal needs a state transition and reduce unnecessary signaling overhead.

Figure 6:
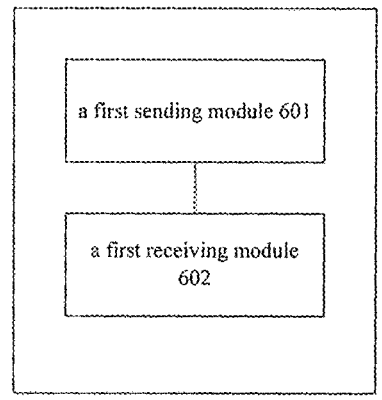
FIG. 6 is a schematic view of an access device in some embodiments of the present disclosure.

Referring to FIG. 6 is a schematic view of an access device in some embodiments of the present disclosure, the access device includes:

a first sending module 601, configured to, in the case that a network side has downlink data needing to be sent to a terminal in an inactive connection state, send to the terminal an indication message carrying an inactive connection state terminal identification of the terminal; and a first receiving module 602, configured to receive an uplink feedback initiated by the terminal based on the indication message.

Optionally, the indication message carries one or more of:
the inactive connection state terminal identification;
an identification of whether the terminal is to turn to a connection state;
a small data packet sent by the access devices to the terminal;
an air interface transmission unique identification of the terminal allocated by the access devices; and
a resource used by the terminal to feed back the indication message.

Optionally, the resource used by the terminal to feed back the indication message includes any one of:
a dedicated uplink access sequence code and a time-frequency resource location of the dedicated uplink access sequence code;
a Hybrid Automatic Repeat Request (HARQ) feedback resource corresponding to the indication message.

Optionally, the access device further includes a first feedback module configured to
determine the terminal based on a dedicated uplink sequence and/or a time-frequency resource location sent by the dedicated uplink sequence, and send a feedback acknowledgement message of the uplink feedback to the determined terminal, where the feedback acknowledgement message carries an identification of the dedicated uplink sequence; or
send a feedback acknowledgement message of the uplink feedback to the terminal through the allocated air interface transmission unique identification of the terminal.

Optionally, the access device further includes a first determining module configured to
determine, in the case that the downlink data arrives, a service type of the downlink data; in the case that the service type of the downlink data is a small data packet service, not trigger the terminal to turn to a connection state; in the case that the service type of the downlink data is a continuous service, trigger the terminal to turn to a connection state; or
determine, in the case that the downlink data arrives, a data size of the downlink data needing to be sent; in the case that the data size of the downlink data is smaller than a predetermined threshold, not trigger the terminal to turn to a connection state; in the case that the data size of the downlink data is larger than the predetermined threshold, trigger the terminal to turn to a connection state.

According to some embodiments of the present disclosure, the terminal in the Inactive state performs the downlink data transmission fast, thereby realizing a fast downlink data transmission, flexibly determining whether a terminal needs a state transition, and reducing unnecessary signaling overhead.

Figure 7:
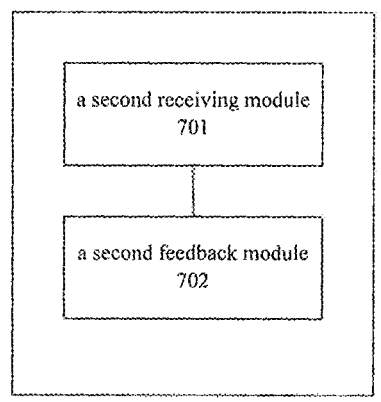
FIG. 7 is a schematic view of a terminal in some embodiments of the present disclosure.

Referring to FIG. 7 which is a schematic view of a terminal in some embodiments of the present disclosure, the terminal includes:

a second receiving module 701, configured to receive an indication message carrying an inactive connection state terminal identification of the terminal sent by one or more access devices; and a second feedback module 702, configured to initiate an uplink feedback to the one or more access devices based on the indication message.

Optionally, the one or more access devices refer to all access devices in an effective area of the inactive connection state terminal identification of the terminal, or all access devices in an effective area of the inactive connection state terminal identification of the terminal in a position area of the terminal determined by the network side.

Optionally, the indication message carries one or more of:
the inactive connection state terminal identification;
an identification of whether the terminal is to turn to a connection state;
a small data packet sent by the terminal to the access devices;
an air interface transmission unique identification of the terminal allocated by the access devices; and
a resource used by the terminal to feed back the indication message.

Optionally, the resource used by the terminal to feed back the indication message includes any one of:
a dedicated uplink access sequence code and a time-frequency resource location of the dedicated uplink access sequence code;
a Hybrid Automatic Repeat Request (HARQ) feedback resource corresponding to the indication message.

Optionally, the second feedback module is further configured to
in the case that the terminal does not need to turn to the connection state, send a dedicated uplink sequence based on the dedicated uplink access sequence code and the time-frequency resource location of the dedicated uplink access sequence code specified by the indication message sent by the access devices; or
in the case that the terminal does not need to turn to the connection state, send an acknowledgement (ACK) feedback based on a HARQ resource determined based on a HARQ resource feedback manner specified by the indication message sent by the access devices; or
in the case that the terminal does not need to turn to the connection state, send an ACK feedback based on a HARQ resource determined based on a manner specified in a protocol; or
in the case that the terminal needs to turn to the connection state, send a dedicated uplink sequence based on the dedicated uplink access sequence code and the time-frequency resource location of the dedicated uplink access sequence code specified by the indication message, activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send a dedicated uplink sequence based on the dedicated uplink access sequence code and the time-frequency resource location of the dedicated uplink access sequence code specified by the indication message, and initiate a Radio Resource Control (RRC) connection establishment process in the case that the access devices do not allocate the air interface transmission unique identification of the terminal; or in the case that the terminal needs to turn to the connection state, send an ACK feedback based on a HARQ feedback resource specified in the indication message or a HARQ resource determined by a manner specified in a protocol, and activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send an ACK feedback based on a HARQ feedback resource specified in the indication message or a HARQ resource determined by a manner specified in a protocol, and initiate a RRC connection establishment process in the case that the access devices do not allocate the air interface transmission unique identification of the terminal.

Optionally, the terminal further includes a second receiving module configured to in the case that the terminal feeds back the indication message through a dedicated uplink sequence, receive a feedback acknowledgement message of the uplink feedback sent by the access devices based on the dedicated uplink sequence and/or a time-frequency resource location sent by the dedicated uplink sequence, where the feedback acknowledgement message carries an identification of the dedicated uplink sequence; or in the case that the terminal sends an ACK feedback and the terminal is determined to turn to the connection state, receive a feedback acknowledgement message of the uplink feedback sent by the accesses devices through the allocated air interface transmission unique identification of the terminal, to acknowledge the uplink feedback.

Optionally, the terminal further includes a second determining module configured to determine whether the terminal needs to turn to a connection state based on the indication message;

in the case that the indication message carries an identification of turning to the connection state and the identification determines that the terminal needs to turn to the connection state, determine that the terminal needs to turn to the connection state; and/or in the case that the indication message carries an air interface transmission unique identification of the terminal allocated for the terminal, determine the terminal needs to turn to the connection state.

Figure 8:
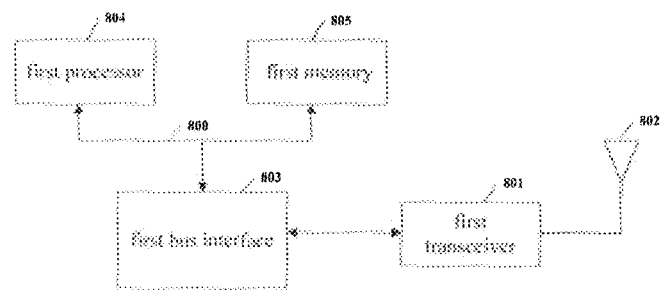
FIG. 8 is a schematic view of an access device in some embodiments of the present disclosure.

Referring to FIG. 8 which is a schematic view of an access device in some embodiments of the present disclosure, the access device includes:

a first processor 804 configured to read a program in the first memory 805 to: in the case that a network side has downlink data needing to be sent to a terminal in an inactive connection state, send to the terminal an indication message carrying an inactive connection state terminal identification of the terminal; and receive an uplink feedback initiated by the terminal based on the indication message;

a first transceiver 801, configured to receive and send data under a control of the first processor 804.

In FIG. 8, a first bus architecture (represented by a first bus 800), which may include any number of interconnected buses and bridges, the first bus 800 will include one or the one represented by the first processor 804. The plurality of processors and the various circuits of the memory represented by the first memory 805 are linked together. The first bus 800 can also link various other circuits, such as peripherals, voltage regulators, and power management circuits, as is known in the art and, therefore, will not be further described herein. The first bus interface 803 provides an interface between the first bus 800 and the first transceiver 801. The first transceiver 801 can be an element or a plurality of elements, such as a plurality of receivers and transmitters, providing means for communicating with various other devices on a transmission medium. Data processed by the first processor 804 is transmitted over the wireless medium by the first antenna 802. Further, the first antenna 802 also receives data and transmits the data to the first processor 804.

The first processor 804 is responsible for managing the first bus 800 and the usual processing, and can also provide various functions including timing, peripheral interfaces, voltage regulation, power management, and other control functions. The first memory 805 can be used to store data used by the first processor 804 in the case that performing operations.

Optionally, the first processor 804 can be a CPU, an ASIC, an FPGA, or a CPLD.

Optionally, the indication message carries one or more of the following:

the inactive connection state terminal identification;

an identification of whether the terminal is to turn to a connection state;

a small data packet sent by the access devices to the terminal;

an air interface transmission unique identification of the terminal allocated by the access devices; and a resource used by the terminal to feed back the indication message.

Optionally, the resource used by the terminal to feed back the indication message includes any one of:

a dedicated uplink access sequence code and a time-frequency resource location of the dedicated uplink access sequence code;

a Hybrid Automatic Repeat Request (HARQ) feedback resource corresponding to the indication message.

Optionally, the first processor 804 is configured to: determine the terminal based on a dedicated uplink sequence and/or a time-frequency resource location sent by the dedicated uplink sequence, and send a feedback acknowledgement message of the uplink feedback to the determined terminal, where the feedback acknowledgement message carries an identification of the dedicated uplink sequence; or send a feedback acknowledgement message of the uplink feedback to the terminal through the allocated air interface transmission unique identification of the terminal.

Optionally, the first processor 804 is configured to: determine, in the case that the downlink data arrives, a service type of the downlink data; in the case that the service type of the downlink data is a small data packet service, not trigger the terminal to turn to a connection state; in the case that the service type of the downlink data is a continuous service, trigger the terminal to turn to a connection state; or determine, in the case that the downlink data arrives, a data size of the downlink data needing to be sent; in the case that the data size of the downlink data is smaller than a predetermined threshold, not trigger the terminal to turn to a connection state; in the case that the data size of the downlink data is larger than the predetermined threshold, trigger the terminal to turn to a connection state.

Figure 9:
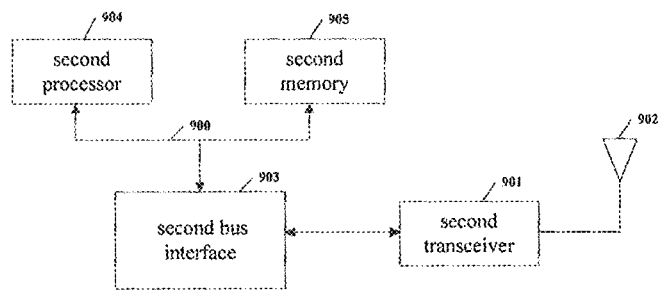
FIG. 9 is a schematic view of a terminal in some embodiments of the present disclosure.

Referring to FIG. 9 which is a schematic view of a terminal in some embodiments of the present disclosure, the terminal includes:

a second processor 904 configured to read the program in the second memory 905 to: receive an indication message carrying an inactive connection state terminal identification of the terminal sent by one or more access devices; and initiate an uplink feedback to the one or more access devices based on the indication message;

a second transceiver 901 configured to receive and send data under a control of the second processor 904.

In FIG. 9, a second bus architecture (represented by a second bus 900), which may include any number of interconnected buses and bridges, the second bus 900 will include one or both represented by the second processor 904. The plurality of processors and the various circuits of the memory represented by the first memory 805 are linked together. The second bus 900 can also link various other circuits, such as peripherals, voltage regulators, and power management circuits, as is well known in the art, and therefore will not be further described herein. The second bus interface 903 provides an interface between the second bus 900 and the second transceiver 901. The second transceiver 901 can be an element or a plurality of elements, such as a plurality of receivers and transmitters, providing means for communicating with various other devices on a transmission medium. Data processed by the second processor 904 is transmitted over the wireless medium via the second antenna 902. Further, the second antenna 902 also receives the data and transmits the data to the second processor 904.

The second processor 904 is responsible for managing the second bus 900 and the usual processing, and can also provide various functions including timing, peripheral interfaces, voltage regulation, power management, and other control functions. The second memory 905 can be used to store data used by the second processor 904 in the case that performing operations.

Optionally, the second processor 904 can be a CPU, an ASIC, an FPGA, or a CPLD.

Optionally, the one or more access devices refer to all access devices in an effective area of the inactive connection state terminal identification of the terminal, or all access devices in an effective area of the inactive connection state terminal identification of the terminal in a position area of the terminal determined by the network side.

Optionally, the indication message carries one or more of:
the inactive connection state terminal identification;
an identification of whether the terminal is to turn to a connection state;
a small data packet sent by the terminal to the access devices;
an air interface transmission unique identification of the terminal allocated by the access devices; and
a resource used by the terminal to feed back the indication message.

Optionally, the resource used by the terminal to feed back the indication message includes any one of:
a dedicated uplink access sequence code and a time-frequency resource location of the dedicated uplink access sequence code;
a Hybrid Automatic Repeat Request (HARQ) feedback resource corresponding to the indication message.

Optionally, the second processor 904 is further configured to: in the case that the terminal does not need to turn to the connection state, send a dedicated uplink sequence based on the dedicated uplink access sequence code and the time-frequency resource location of the dedicated uplink access sequence code specified by the indication message sent by the access devices; or in the case that the terminal does not need to turn to the connection state, send an acknowledgement (ACK) feedback based on a HARQ resource determined based on a HARQ resource feedback manner specified by the indication message sent by the access devices; or in the case that the terminal does not need to turn to the connection state, send an ACK feedback based on a HARQ resource determined based on a manner specified in a protocol; or in the case that the terminal needs to turn to the connection state, send a dedicated uplink sequence based on the dedicated uplink access sequence code and the time-frequency resource location of the dedicated uplink access sequence code specified by the indication message, activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send a dedicated uplink sequence based on the dedicated uplink access sequence code and the time-frequency resource location of the dedicated uplink access sequence code specified by the indication message, and initiate a Radio Resource Control (RRC) connection establishment process in the case that the access devices do not allocate the air interface transmission unique identification of the terminal; or in the case that the terminal needs to turn to the connection state, send an ACK feedback based on a HARQ feedback resource specified in the indication message or a HARQ resource determined by a manner specified in a protocol, and activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send an ACK feedback based on a HARQ feedback resource specified in the indication message or a HARQ resource determined by a manner specified in a protocol, and initiate a RRC connection establishment process in the case that the access devices do not allocate the air interface transmission unique identification of the terminal.

Optionally, the second processor 904 is further configured to: in the case that the terminal feeds back the indication message through a dedicated uplink sequence, receive a feedback acknowledgement message of the uplink feedback sent by the access devices based on the dedicated uplink sequence and/or a time-frequency resource location sent by the dedicated uplink sequence, where the feedback acknowledgement message carries an identification of the dedicated uplink sequence; or in the case that the terminal sends an ACK feedback and the terminal is determined to turn to the connection state, receive a feedback acknowledgement message of the uplink feedback sent by the accesses devices through the allocated air interface transmission unique identification of the terminal, to acknowledge the uplink feedback.

Optionally, the second processor 904 is further configured to determine whether the terminal needs to turn to a connection state based on the indication message;

in the case that the indication message carries an identification of turning to the connection state and the identification determines that the terminal needs to turn to the connection state, determine that the terminal needs to turn to the connection state; and/or in the case that the indication message carries an air interface transmission unique identification of the terminal allocated for the terminal, determine the terminal needs to turn to the connection state.

According to the embodiments of the present disclosure, a fast downlink data transmission can be realized. Furthermore, since the access device can send the small data packet to the terminal in the Inactive state, thereby avoiding the signaling overhead caused by the transition of the terminal state, flexibly determining whether the terminal needs state transition, and further reducing unnecessary signaling overhead.

It will be understood that "some embodiments" are used throughout the specification to mean that the particular features, structures, or characteristics of the embodiments are included in at least one embodiment of the present disclosure. Therefore, "in some embodiments of the present disclosure" appearing throughout the specification does not necessarily refer to the same embodiment. In addition, these particular features, structures, or characteristics may be combined in any suitable manner in one or more embodiments.

In the embodiments of the present disclosure, it should be understood that the size of the serial numbers of the above processes does not mean the order of execution, and the order of execution of each process should be determined by its function and internal logic, and should not be taken to the embodiments of the present disclosure. Implementation process constitutes any qualification Additionally, the terms "system" and "network" are used interchangeably herein.

It should be understood that the term "and/or" herein is merely an association relationship describing an associated object, indicating that there may be three relationships, for example, A and/or B, which may indicate that A exists separately, and A and B exist simultaneously. There are three cases of B alone. In addition, the character "/" in this article generally indicates that the contextual object is an "or" relationship.

In the embodiments provided herein, it should be understood that "B corresponding to A" means that B is associated with A, and B can be determined from A. However, it should also be understood that determining B from A does not mean that B is determined solely from A, and that B can also be determined based on A and/or other information.

In some embodiments provided in the present application, it should be understood that the disclosed method and apparatus may be implemented in other manners. For example, the device embodiments described above are merely illustrative. For example, the division of the unit is only a logical function division. In actual implementation, there may be another division manner, for example, a plurality of units or components may be combined or can be integrated into another system, or some features can be ignored or not executed. In addition, the coupling or direct coupling or communication connection shown or discussed may be an indirect coupling or communication connection through some interface, device or unit, and may be electrical, mechanical or otherwise.

In addition, each functional unit in various embodiments of the present disclosure may be integrated into one processing unit, or each unit may be physically included separately, or two or more units may be integrated into one unit. The above integrated unit can be implemented in the form of hardware or in the form of hardware plus software functional units.

The above-described integrated unit implemented in the form of a software functional unit can be stored in a computer readable storage medium. The above software functional unit is stored in a storage medium and includes a plurality of instructions for causing a computer device (which may be a personal computer, a server, or a network device, etc.) to perform part of the steps of the transceiving method of the various embodiments of the present disclosure. The foregoing storage medium includes: a U disk, a mobile hard disk, a read-only memory (ROM), a random access memory (RAM), a magnetic disk, or an optical disk, and the like, and the program code can be stored. Medium.

The present disclosure is described with reference to flowchart illustrations and/or block views of methods, apparatus (system), and computer program products in some embodiments of the present disclosure. It will be understood that each flow and/or block of the flowchart illustrations and/or FIG. These computer program instructions can be provided to a processor of a general purpose computer, special purpose computer, embedded processor, or other programmable data processing device to produce a machine for the execution of instructions for execution by a processor of a computer or other programmable data processing device. Means for implementing the functions specified in one or more flows of the flowchart or in a block or blocks of the flowchart.

The computer program instructions can also be stored in a computer readable memory that can direct a computer or other programmable data processing device to operate in a particular manner, such that the instructions stored in the computer readable memory produce an article of manufacture comprising the instruction device. The apparatus implements the functions specified in one or more blocks of a flow or a flow and/or block view of the flowchart.

These computer program instructions can also be loaded onto a computer or other programmable data processing device such that a series of operational steps are performed on a computer or other programmable device to produce computer-implemented processing for execution on a computer or other programmable device. The instructions provide steps for implementing the functions specified in a block or blocks of a flow or a flow and/or a block view of a flowchart.

The above are some embodiments of the present disclosure, and it should be noted that those skilled in the art can also make several improvements and refinements without departing from the principle of the present disclosure, which may also fall into the scope of the present disclosure.

What is claimed is:

1. A method for downlink data transmission, comprising:
in the case that a network side has downlink data needing to be sent to a terminal in an inactive connection state, sending, to the terminal, by one or more access devices, an indication message carrying an inactive connection state terminal identification of the terminal; and
receiving, by the one or more access devices, an uplink feedback initiated by the terminal based on the indication message;

wherein the indication message carries one or more of:
the inactive connection state terminal identification;
an identification of whether the terminal is to turn to a connection state;
a small data packet sent by the access devices to the terminal;
an air interface transmission unique identification of the terminal allocated by the access devices; and
a resource used by the terminal to feed back the indication message;
wherein the resource used by the terminal to feed back the indication message comprises any one of:
a dedicated uplink access sequence code and a time-frequency resource location of the dedicated uplink access sequence code;
a Hybrid Automatic Repeat Request (HARQ) feedback resource corresponding to the indication message;
wherein the method further comprises:
determining, by the access devices, the terminal based on a dedicated uplink sequence and/or a time-frequency resource location sent by the dedicated uplink sequence, and sending a feedback acknowledgement message of the uplink feedback to the determined terminal, wherein the feedback acknowledgement message carries an identification of the dedicated uplink sequence; or
sending, by the access devices, a feedback acknowledgement message of the uplink feedback to the terminal through the allocated air interface transmission unique identification of the terminal.

2. The method according to claim 1, wherein the one or more access devices refer to all access devices in an effective area of the inactive connection state terminal identification of the terminal, or all access devices in an effective area of the inactive connection state terminal identification of the terminal in a position area of the terminal determined by the network side.

3. The method according to claim 1, further comprising:
determining by the access devices, in the case that the downlink data arrives, a service type of the downlink data;
in the case that the service type of the downlink data is a small data packet service, not triggering the terminal to turn to a connection state; in the case that the service type of the downlink data is a continuous service, triggering the terminal to turn to a connection state; or
determining by the access devices, in the case that the downlink data arrives, a data size of the downlink data needing to be sent;
in the case that the data size of the downlink data is smaller than a predetermined threshold, not triggering the terminal to turn to a connection state; in the case that the data size of the downlink data is larger than the predetermined threshold, triggering the terminal to turn to a connection state.

4. An access device, comprising a processor, a transceiver and a memory, wherein the processor is configured to read a program stored in the memory to perform the method for downlink data transmission according to claim 1.

5. The access device according to claim 4, wherein the processor is further configured to read a program stored in the memory to
determine, in the case that the downlink data arrives, a service type of the downlink data;
in the case that the service type of the downlink data is a small data packet service, not trigger the terminal to turn to a connection state; in the case that the service type of the downlink data is a continuous service, trigger the terminal to turn to a connection state; or
determine, in the case that the downlink data arrives, a data size of the downlink data needing to be sent;
in the case that the data size of the downlink data is smaller than a predetermined threshold, not trigger the terminal to turn to a connection state; in the case that the data size of the downlink data is larger than the predetermined threshold, trigger the terminal to turn to a connection state.

6. A method for downlink data transmission, comprising:
receiving, by a terminal, an indication message carrying an inactive connection state terminal identification of the terminal sent by one or more access devices;
initiating, by the terminal, an uplink feedback to the one or more access devices based on the indication message;
wherein the indication message carries one or more of:
the inactive connection state terminal identification;
an identification of whether the terminal is to turn to a connection state;
a small data packet sent by the terminal to the access devices;
an air interface transmission unique identification of the terminal allocated by the access devices; and
a resource used by the terminal to feed back the indication message;
wherein the resource used by the terminal to feed back the indication message comprises any one of:
a dedicated uplink access sequence code and a time-frequency resource location of the dedicated uplink access sequence code;
a Hybrid Automatic Repeat Request (HARQ) feedback resource corresponding to the indication message;
wherein the initiating, by the terminal, an uplink feedback to the one or more access devices based on the indication message comprises:
in the case that the terminal does not need to turn to the connection state, sending, by the terminal, a dedicated uplink sequence based on the dedicated uplink access sequence code and the time-frequency resource location of the dedicated uplink access sequence code specified by the indication message sent by the access devices; or
in the case that the terminal does not need to turn to the connection state, sending, by the terminal, an acknowledgement (ACK) feedback based on a HARQ resource determined based on a HARQ resource feedback manner specified by the indication message sent by the access devices; or
in the case that the terminal does not need to turn to the connection state, sending, by the terminal, an ACK feedback based on a HARQ resource determined based on a manner specified in a protocol.

7. The method according to claim 6, wherein the one or more access devices refer to all access devices in an effective area of the inactive connection state terminal identification of the terminal, or all access devices in an effective area of the inactive connection state terminal identification of the terminal in a position area of the terminal determined by the network side.

8. The method according to claim 6, further comprising:
in the case that the terminal feeds back the indication message through a dedicated uplink sequence, receiving, by the terminal, a feedback acknowledgement message of the uplink feedback sent by the access devices based on the dedicated uplink sequence and/or a time-frequency resource location sent by the dedicated uplink sequence, wherein the feedback acknowledgement message carries an identification of the dedicated uplink sequence; or in the case that the terminal sends an ACK feedback and the terminal is determined to turn to the connection state, receiving, by the terminal, a feedback acknowledgement message of the uplink feedback sent by the accesses devices through the allocated air interface transmission unique identification of the terminal, to acknowledge the uplink feedback.

9. The method according to claim 6, further comprising:

determining, by the terminal, whether the terminal needs to turn to a connection state based on the indication message;

in the case that the indication message carries an identification of turning to the connection state and the identification determines that the terminal needs to turn to the connection state, determining that the terminal needs to turn to the connection state; and/or in the case that the indication message carries an air interface transmission unique identification of the terminal allocated for the terminal, determining that the terminal needs to turn to the connection state.

10. A terminal, comprising a processor, a transceiver and a memory, wherein the processor is configured to read a program stored in the memory to:

receive an indication message carrying an inactive connection state terminal identification of the terminal sent by one or more access devices; and initiate an uplink feedback to the one or more access devices based on the indication message;

wherein the indication message carries one or more of:

the inactive connection state terminal identification;

an identification of whether the terminal is to turn to a connection state;

a small data packet sent by the terminal to the access devices;

an air interface transmission unique identification of the terminal allocated by the access devices; and a resource used by the terminal to feed back the indication message;

wherein the resource used by the terminal to feed back the indication message comprises any one of:

a dedicated uplink access sequence code and a time-frequency resource location of the dedicated uplink access sequence code;

a Hybrid Automatic Repeat Request (HARQ) feedback resource corresponding to the indication message;

wherein the processor is further configured to read the program stored in the memory to:

in the case that the terminal does not need to turn to the connection state, send a dedicated uplink sequence based on the dedicated uplink access sequence code and the time-frequency resource location of the dedicated uplink access sequence code specified by the indication message sent by the access devices; or in the case that the terminal does not need to turn to the connection state, send an acknowledgement (ACK) feedback based on a HARQ resource determined based on a HARQ resource feedback manner specified by the indication message sent by the access devices; or in the case that the terminal does not need to turn to the connection state, send an ACK feedback based on a HARQ resource determined based on a manner specified in a protocol; or in the case that the terminal needs to turn to the connection state, send a dedicated uplink sequence based on the dedicated uplink access sequence code and the time-frequency resource location of the dedicated uplink access sequence code specified by the indication message, activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send a dedicated uplink sequence based on the dedicated uplink access sequence code and the time-frequency resource location of the dedicated uplink access sequence code specified by the indication message, and initiate a Radio Resource Control (RRC) connection establishment process in the case that the access devices do not allocate the air interface transmission unique identification of the terminal; or in the case that the terminal needs to turn to the connection state, send an ACK feedback based on a HARQ feedback resource specified in the indication message or a HARQ resource determined by a manner specified in a protocol, and activate the air interface transmission unique identification of the terminal allocated by the access devices in the case that the indication message carries the air interface transmission unique identification of the terminal, to enable the terminal to turn to the connection state; or in the case that the terminal needs to turn to the connection state, send an ACK feedback based on a HARQ feedback resource specified in the indication message or a HARQ resource determined by a manner specified in a protocol, and initiate a RRC connection establishment process in the case that the access devices do not allocate the air interface transmission unique identification of the terminal.

11. The terminal according to claim 10, wherein the one or more access devices refer to all access devices in an effective area of the inactive connection state terminal identification of the terminal, or all access devices in an effective area of the inactive connection state terminal identification of the terminal in a position area of the terminal determined by the network side.

12. The terminal according to claim 10, wherein the processor is further configured to read a program stored in the memory to in the case that the terminal feeds back the indication message through a dedicated uplink sequence, receive a feedback acknowledgement message of the uplink feedback sent by the access devices based on the dedicated uplink sequence and/or a time-frequency resource location sent by the dedicated uplink sequence, wherein the feedback acknowledgement message carries an identification of the dedicated uplink sequence; or in the case that the terminal sends an ACK feedback and the terminal is determined to turn to the connection state, receive a feedback acknowledgement message of the uplink feedback sent by the accesses devices through the allocated air interface transmission unique identification of the terminal, to acknowledge the uplink feedback.

13. The terminal according to claim 10, wherein the processor is further configured to read a program stored in the memory to determine whether the terminal needs to turn to a connection state based on the indication message;

in the case that the indication message carries an identification of turning to the connection state and the identification determines that the terminal needs to turn to the connection state, determine that the terminal needs to turn to the connection state; and/or in the case that the indication message carries an air interface transmission unique identification of the terminal allocated for the terminal, determine the terminal needs to turn to the connection state.

\* \* \* \* \*